Patented May 2, 1933

1,906,935

UNITED STATES PATENT OFFICE

WILLIAM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Original application filed December 4, 1929, Serial No. 411,665. Divided and this application filed September 12, 1930. Serial No. 481,581.

This invention relates to the treatment of rubber and similar materials, more particularly to a treatment of the same with aldehyde derivatives of reaction products of secondary aromatic amino compounds and aliphatic ketones. The invention also relates to the products of such treatment.

This case is a continuation in part of Case Serial No. 411,665, filed Dec. 4, 1929.

An object of this invention is to provide materials having the property of retarding the deterioration of rubber. Another object is to provide materials having the property of improving the resistance of rubber to abrasion. A further object is to provide materials which prevent or retard cracking of tread stocks containing carbon black. Still another object is to provide an antioxidant which when incorporated in white or light colored stocks will cause only slight discoloration when exposed to sunlight. Other objects will be apparent from the following detailed description.

Reaction products of secondary amino compounds and aliphatic ketones may be prepared by reacting the amino compound and the ketone with the aid of a suitable catalytic dehydrating agent. Examples of such products are the reaction products of acetone and diphenylamine, acetone and phenyl alpha-naphthylamine, acetone and phenyl beta-naphthylamine, acetone and diphenyl ethylene diamine, acetone and mono ethyl aniline, methyl ethyl ketone and phenyl alpha-naphthylamine, mesityl oxide and phenyl alpha-naphthylamine, acetone and diphenyl formamidine, mesityl oxide and phenyl beta-naphthylamine, acetone and diortho tolyl guanidine, acetone and diphenyl guanidine, acetone and p-p' di (naphthylamino) diphenyl methane, acetone and ortho tolyl biguanide. Their preparation is illustrated by the following procedures:

*Example A.*—The reaction between acetone and diphenyl amine is preferably carried out at relatively high temperatures and high pressures in the presence of a dehydration agent, such as iodine which also has a catalytic effect on the reaction. The amount of acetone may vary from one to three moles per mole of diphenylamine. For example 320 pounds of diphenylamine, 220 pounds of acetone, 600 grams of iodine are heated during 20 hours at approximately 220° C. The pressure is approximately 600 pounds per square inch at this temperature. An iron autoclave may be used with or without agitation. At the end of about 20 hours the contents are cooled and the excess acetone and water formed are distilled off. The remaining product is a dark brown liquid which may be used as such in the rubber or further purified. The reaction time may be shortened by raising the temperature, for example at a temperature of 260° C. a reaction time of 12 hours is sufficient. It has also been found that increasing the amount of iodine shortens the time of reaction, for example the use of 1000 grams of iodine allows a satisfactory reaction at 220° C. in about 12 hours. Instead of using iodine, hydrochloric acid may be used.

*Example B.*—Reaction product of acetone and phenyl beta naphthylamine: A mixture of 219 grams phenyl beta naphthylamine, 696 grams acetone and 10 grams of iodine are heated at approximately 210 to 220° C. during 33 hours. The pressure at this temperature is approximately 600 pounds per square inch. The crude reaction product is filtered through glass wool and the excess of acetone and the water formed during the reaction are removed by distillation.

*Example C.*—The reaction product of acetone and phenyl alpha-naphthyl-amine. This chemical is made according to the general procedure, namely by heating a mixture of 219 grams phenyl alpha naphthyl amine, 116 grams of acetone, and 1.3 grams of iodine during 20 hours at approximately 210 to 220° C. The product which remains after removal of acetone and water is a free-flowing oil.

Other ketones than those mentioned that may be used are phorone, diethyl ketone, mono-chlor-acetone, dichloracetone, aldol-acetone, diacetyl, acetyl-acetone, acetonyl acetone, diacetone alcohol, ethylidene-acetone, allyl-acetone, aceto-phenone, benzal acetone, furfural-acetone, salicyl aldehyde-acetone, cyclo-pentanone, cyclohexanone. Other secondary amino compounds than those mentioned that may be used are dinaphthyl amines, naphthyl amino diphenyl, carbazole, p-nitro diphenyl amine, 2,4 dinitrodiphenyl amine, p-amino-di-phenylamine, p-hydroxy-diphenyl-amine, sym-diphenyl-p-phenylene diamine, p-amino benzyl-aniline, p-amino p'-naphthylamino diphenyl methane, sym-dinaphthyl-p-phenylene diamine, phenyl beta naphthyl guanidine, phenyl o-tolyl guanidine, di-o-tolyl biguanide, mono phenyl biguanide, diphenyl biguanide. Certain dehydrating agents have been mentioned as giving particularly effective results, but the invention generally is not to be limited thereto. Other dehydrating agents may be used such as calcium chloride, sulfanilic acid, phosphorus pentoxide, sodium hydroxide, magnesium perchlorate, acetic acid, barium oxide, zinc chloride, the amine addition product with zinc chloride such as $(C_6H_5NH_2)_2ZnCl_2$, sulphuric acid, etc.

It is to be understood that the term "aliphatic ketone" includes both saturated and unsaturated aliphatic ketones of the open-chain and cyclo-aliphatic series, as well as hydroxyl- and halogen-substituted derivatives of such ketones, and ketones obtained by condensation of the foregoing with aldehydes and ketones,—and that the term also includes ketones comprising one aliphatic group and one aromatic group linked to the

group.

It is further to be understood that the term "secondary aromatic amino compound" includes broadly any aromatic amino compound which comprises at least one secondary amino nitrogen atom linked to an aromatic nucleus.

The following embodiments are illustrative of the invention but are not to be construed as limiting thereof:

*Example 1.*—To 115.5 grams of the reaction product of acetone and diphenylamine are added 102.5 grams of 40% aqueous formaldehyde solution and two drops of concentrated hydrochloric acid. Heat is applied until a temperature of approximately 55° C. is reached, at which point an exothermic reaction starts, causing the temperature to rise to approximately 70° C. When this first rather violent reaction is over the temperature is raised to approximately 80° C. by external application of heat and kept at 80° C. during 6 hours. The water formed during the condensation is then poured off and the formaldehyde reaction product is washed, dried, and ground. The product obtained is tested in carbon black stock in which diphenyl guanidine is used as the accelerator. Two mixes were made up, one containing no antioxidant, called the blank, and another one containing my formaldehyde acetone-diphenylamine condensation product.

| Green tensiles lbs/sq. in. Cure | Blank | +1.5 parts anti-oxidant |
|---|---|---|
| 60' at 45#  | 4690 | 4423 |
| 75' at 45#  | 4497 | 4713 |
| Aged tensiles 168 hrs. in oxygen | | |
| 60' at 45#  | 750 | 2175 |
| 75' at 45#  | 837 | 2167 |

In a truck inner tube in which the condensation product of butyraldehyde and aniline is used as the accelerator I obtain the following result:

| Green tensiles | Blank | +1 part anti-oxidant |
|---|---|---|
| Cure 5' at 60# | 2462 | 2915 |
| Cure 10' at 60# | 3665 | 3542 |
| Aged 8 hrs. at 245° F. 100% elong. 70# air | | |
| Cure 5' at 60# | 189 | 545 |
| Cure 10' at 60# | 102 | 346 |

This is a very severe aging test and the acetone-diphenylamine formaldehyde condensation product is very effective in preventing undue softening of the stock.

Cured white sheeting stocks in which phenyl o-tolyl guanidine is used as the accelerator, and containing the acetone-diphenyl-amine-formaldehyde condensation product as the antioxidant, show less discoloration when exposed to sunlight than similar stocks containing acetone-diphenylamine condensation product as the antioxidant. The green and aged tensiles for this white sheeting stock are given below:

| Green tensiles | Blank | +1 part formaldehyde reaction product |
|---|---|---|
| Cure 30' at 40# | 3125 | 3555 |
| Cure 45' at 40# | 3598 | 2947 |
| Aged 168 hrs. in oxygen | | |
| Cure 30' at 40# | 1862 | 2640 |
| Cure 45' at 40# | Too poor to test | 1910 |

A rubber tiling stock containing .06% of the formaldehyde derivative of acetone-diphenylamine reaction product is vulcanized for 18 minutes at 60 lbs. steam pressure. A sample of the stock is then subjected to oxygen at 60° C. and at a pressure of 300 lbs. per sq. in. The sample fails after 240 hours, whereas a similar stock containing no antioxidant fails in 24 hours. Samples of the cured stocks are also exposed to bright sunlight for two weeks. The sample containing the anti-oxidant is found to be discolored no more than the blank stock.

*Example 2.*—In a second preparation of the acetone diphenylamine-formaldehyde condensation product a much smaller amount of formaldehyde is used. To 100 grams of acetone-diphenylamine condensation product are added 20 grams aqueous formaldehyde solution 37% by weight and two drops concentrated hydrochloric acid. At 50° C. a reaction suddenly starts causing the temperature to rise to approximately 70° C. without application of external heat. The temperature is kept at 50 to 55° C. during 15 minutes. The reaction mixture is then warmed to 105° C. in order to remove the water which was formed during the reaction. The product becomes solid on cooling and can be ground to a reddish brown powder. This material, which has a melting range of approximately 40 to 50° C. is tested in a carbon black stock in which diphenyl guanidine is used as the accelerator.

| Green tensiles | Blank | Stock containing 1 part antioxidant |
|---|---|---|
| Cure 60′ at 45#  | 4712 | 4537 |
| Cure 75′ at 45#  | 4423 | 4417 |
| Aged tensiles 168 hrs. in oxygen | | |
| Cure 60′ at 45#  | 1456 | 2736 |
| Cure 75′ at 45#  | 1495 | 3248 |
| Green abrasions | | |
| Cure 60′ at 45#  | 132 | 120 |
| Cure 75′ at 45#  | 144 | 139 |
| Abrasions after 168 hrs. in oxygen | | |
| Cure 60′ at 45#  | 71 | 99 |
| Cure 75′ at 45#  | 71 | 95 |

The acetone-diphenylamine-formaldehyde condensation product was effective in retarding the loss in resistance to abrasion of tire tread stocks. The green flex cracking values for these stocks are given below: Values are given in kilocycles, one kilocycle indicating a complete cycle of stretching and bending repeated 1000 times. Definite cracking of the stock indicates the end point.

| Green flex cracking | Number of kilocycles to cause failure | |
|---|---|---|
| | Blank | + 1 part antioxidant |
| 60′ at 45#  | 87 | 121 |

In a truck inner tube in which a butyraldehyde-aniline condensation product is used as the accelerator I obtain the following results:

| Green tensiles | Blank | + 1 part antioxidant |
|---|---|---|
| Cure 5′ at 60#  | 3995 | 3110 |
| Cure 10′ at 60#  | 3355 | 3397 |
| Aged 8 hrs. at 245° F. 100% elong. 70# air | | |
| Cure 5′ at 60#  | 65 | 444 |
| Cure 10′ at 60#  | 65 | 319 |

After the above ageing test the blank stock is very soft and sticky, whereas the stock containing the anti-oxidant is still comparatively strong and resilient.

*Example 3.*—A third type of acetone diphenylamine formaldehyde condensation product is prepared simply from the acetone-diphenylamine condensation product and formaldehyde, omitting the acid catalyst.

To 50 grams of the acetone-diphenylamine condensation product are added 30 grams 37% formaldehyde solution. The mass is heated to 80° C. at which temperature a reaction starts and proceeds rather violently. The temperature is kept at 90° during one-half hour and the reaction mixture is allowed to stand during 16 hours. The water which formed during the reaction is then poured off and the reaction product is washed and air-dried. A light brown resin is obtained. This material possesses excellent antioxidant properties, as shown by the following results:

| Green tensiles | Blank | + 1 part antioxidant |
|---|---|---|
| Cure 60′ at 45#  | 4577 | 4508 |
| Cure 75′ at 45#  | 4600 | 4890 |
| Aged 168 hrs. in oxygen | | |
| Cure 60′ at 45#  | 1168 | 2901 |
| Cure 75′ at 45#  | 1477 | 2972 |

The stock used in this test is a carbon black stock in which diphenyl guanidine is used as the accelerator.

In a truck inner tube this type of acetonediphenyl-amine formaldehyde condensation product shows up very well.

| Green tensiles | Blank | Stock containing 1 part antioxidant |
|---|---|---|
| 5′ at 60#  | 2965 | 2880 |
| Aged 8 hrs. at 245° F. 100% elong. 70# air | | |
| 5′ at 60# | 116 | 462 |

*Example 4.*—Acetaldol-acetone-diphenyl amine condensation product. To 103.5 grams of acetone-diphenylamine condensation product and 40 grams acetaldol are added 2 drops of concentrated hydrochloric acid. When heat is applied, a reaction starts at approximately 55° C., causing the temperature to rise to approximately 75° C. The temperature is kept at 80 to 90° C. during 6 hours. The excess aldol and the water formed during the reaction are removed by distillation. 114 parts of solid product are obtained. This material is tested in a carbon black stock in which hexamethylenetetramine and diphenyl guanidine are used as the accelerators. The stocks are subjected to ageing and abrasion tests, with the results indicated in the following table:

| Green tensiles | Blank | Stock cont. 1.5 parts antioxidant |
|---|---|---|
| Cure 60′ at 45# | 4310 | 3904 |
| Cure 75′ at 45# | 4149 | 4630 |
| Aged 168 hrs. in oxygen | | |
| Cure 60′ at 45# | 1598 | 3189 |
| Cure 75′ at 45# | 2026 | 3092 |
| Relative wear before aging | | |
| Cure 60′ at 45# | 144 | 142 |
| Cure 75′ at 45# | 149 | 144 |
| Relative wear after aging 168 hrs. in oxygen bomb | | |
| Cure 60′ at 45# | 87 | 119 |
| Cure 75′ at 45# | 88 | 121 |

These results show the acetaldol-acetone-diphenyl condensation product to be an excellent antioxidant.

*Example 5.*—The butyraldehyde condensation product of acetone-diphenylamine reaction product is prepared as follows: 100 grams of butyraldehyde are added to 78 grams of acetone-diphenylamine reaction product containing 2 drops of concentrated hydrochloric acid, and heat is applied. At 60° C. a reaction starts. The temperature is kept during 6 hours at approximately 60° C. 47 parts of unreacted butyraldehyde are recovered by distillation. The reaction product is a black plastic mass. Yield, 104 grams. This material is tested in which hexamethylene tetramine and diphenyl guanidine are used as the accelerators. Tensile and abrasion tests were made before and after ageing, as above:

| Green tensiles | Blank | +1 part antioxidant |
|---|---|---|
| Cure 60′ at 45# | 4177 | 4399 |
| Cure 75′ at 45# | 4163 | 4377 |
| Aged 168 hrs. in oxygen | | |
| Cure 60′ at 45# | 1392 | 3150 |
| Cure 75′ at 45# | 1360 | 3003 |
| Relative wear before ageing | | |
| Cure 60′ at 45# | 128 | 133 |
| Cure 75′ at 45# | 133 | 135 |
| Relative wear after ageing 168 hrs. in oxygen | | |
| Cure 60′ at 45# | 80 | 112 |
| Cure 75′ at 45# | 84 | 114 |

This material when tested in a white sheeting stock in which phenyl o-tolyl guanidine is used as the accelerator shows the following excellent antioxidant properties:

| Green tensiles | Blank | Stock containing 1 part butyraldehyde cond. prod. |
|---|---|---|
| 30′ at 40# | 3125 | 3555 |
| 45′ at 40# | 3598 | 2947 |
| Aged tensiles 168 hrs. in oxygen | | |
| 30′ at 40# | 1862 | 264 |
| 45′ at 40# | Too poor to test | 191 |

Instead of the aldehydes mentioned, other aldehydes may be used such as acetaldehyde, paraldehyde, crotonaldehyde, heptaldehyde etc. Where the aldehyde has a low boiling point the reaction may be carried out under pressure. Instead of using a single aldehyde a mixture of aldehydes may be used. The rubber also may be treated with a mixture of the antioxidants instead of a single antioxidant material. Also in preparing the ketone-amine compounds, a mixture of ketones or a single ketone may be reacted with a single amino compound or with a mixture of amino compounds.

The invention may be used to retard the deterioration of inner tubes, tire treads, mechanical goods, footwear, rubber tiling stocks, latex and articles made from latex etc. The term "rubber" is to be construed broadly as covering rubber in any form including natural rubber, synthetic rubber, gutta percha, balata, or other rubber-like materials.

With the detailed description given above, it will be obvious that modifications will suggest themselves,—for example other accelerators and suitable compounding ingredients may be used in conjunction with the antioxidants,—all without departing from the principles of the invention, and it is not desired to limit the invention otherwise than as set forth in the appended claims.

Having thus described my invention, what I claim and desire to protect by Letters Patent is:

1. A process of treating rubber which comprises incorporating therewith an aldehyde derivative of the reaction product of an aliphatic ketone and a secondary aromatic amine.

2. A process of treating rubber which comprises incorporating therewith an aldehyde derivative of the reaction product of an aliphatic ketone and a diarylamine.

3. A process of treating rubber which comprises incorporating therewith an aliphatic aldehyde derivative of the reaction product of an aliphatic ketone and a diarylamine.

4. A process of treating rubber which comprises incorporating therewith an aldehyde derivative of the reaction product of acetone and a diarylamine.

5. A process of treating rubber which comprises incorporating therewith an aldehyde derivative of the reaction product of acetone and a compound having the general formula R-NH-R' wherein R is an aryl group and R' is a naphthyl group.

6. A process of improving the properties of rubber which comprises treating rubber with an aldehyde derivative of the reaction product of acetone and diphenylamine.

7. A process of improving the properties of rubber which comprises treating rubber with a formaldehyde derivative of the reaction product of acetone and diphenylamine.

8. A process of improving the properties of rubber which comprises treating rubber with an aldol derivative of the reaction product of acetone and diphenylamine.

9. A rubber product resulting from the process set forth in claim 1.

10. A vulcanized rubber product resulting from the process set forth in claim 2.

11. A rubber product resulting from the process set forth in claim 3.

12. A rubber product resulting from treating rubber according to the process of claim 6.

13. A rubber product resulting from treating rubber according to the process of claim 7.

14. A rubber product resulting from treating rubber according to the process of claim 8.

15. A process of improving the properties of rubber compositions which comprises adding thereto the condensation product of an aliphatic aldehyde and an acetone-diarylamine reaction product, and vulcanizing the rubber.

16. A process of improving the properties of rubber compositions which comprises adding thereto the condensation product of an aliphatic aldehyde and an acetone-diphenylamine reaction product, and vulcanizing the rubber.

17. A process of improving the properties of rubber compositions which comprises adding thereto the condensation product of an aliphatic aldehyde and a compound having the general formula R-NH-R' wherein R is an aryl group and R' is a naphthyl group, and vulcanizing the rubber.

18. A process of improving the properties of rubber compositions which comprises adding thereto the condensation product of an aldehyde and an aliphatic ketone-secondary aromatic amine reaction product, and vulcanizing the rubber.

19. A process of improving the properties of rubber compositions which comprises adding thereto the condensation product of an aliphatic aldehyde and an aliphatic ketone-secondary aromatic amine reaction product, and vulcanizing the rubber.

Signed at Passaic, county of Passaic, State of New Jersey, this 22d day of August 1930.

WILLIAM P. TER HORST.